(12) United States Patent
Robinson

(10) Patent No.: US 11,219,290 B2
(45) Date of Patent: Jan. 11, 2022

(54) PORTABLE SOLAR USB CHARGER STORAGE LOCKER

(71) Applicant: Raenee Robinson, Los Angeles, CA (US)

(72) Inventor: Raenee Robinson, Los Angeles, CA (US)

(*) Notice: Subject to any disclaimer, the term of this patent is extended or adjusted under 35 U.S.C. 154(b) by 282 days.

(21) Appl. No.: 16/551,619

(22) Filed: Aug. 26, 2019

(65) Prior Publication Data

US 2020/0060403 A1 Feb. 27, 2020

Related U.S. Application Data

(60) Provisional application No. 62/722,248, filed on Aug. 24, 2018.

(51) Int. Cl.
| | |
|---|---|
| A45C 15/00 | (2006.01) |
| A45C 15/06 | (2006.01) |
| A45C 13/02 | (2006.01) |
| A45C 11/24 | (2006.01) |
| H02S 10/40 | (2014.01) |
| H02S 30/10 | (2014.01) |
| H02S 40/34 | (2014.01) |
| H02S 40/38 | (2014.01) |
| H01R 25/00 | (2006.01) |
| H02J 7/00 | (2006.01) |
| H02J 7/35 | (2006.01) |
| A45C 13/00 | (2006.01) |
| A45C 15/04 | (2006.01) |

(52) U.S. Cl.
CPC .............. *A45C 15/00* (2013.01); *A45C 11/24* (2013.01); *A45C 13/008* (2013.01); *A45C 13/02* (2013.01); *A45C 15/04* (2013.01); *A45C 15/06* (2013.01); *H01R 25/006* (2013.01); *H02J 7/00* (2013.01); *H02J 7/35* (2013.01); *H02S 10/40* (2014.12); *H02S 30/10* (2014.12); *H02S 40/34* (2014.12); *H02S 40/38* (2014.12); *A45C 2013/026* (2013.01)

(58) Field of Classification Search
CPC ....... A45C 11/24; A45C 13/008; A45C 15/00; A45C 15/04; A45C 15/06; A45C 2103/026; H02S 10/40; H02S 30/10; H02S 40/34; H02S 40/38; H02J 7/00; H01R 25/006
USPC .......................................................... 206/216
See application file for complete search history.

(56) References Cited

U.S. PATENT DOCUMENTS

| | | | | |
|---|---|---|---|---|
| 3,001,748 | A * | 9/1961 | Austin ................... | A45C 15/04 248/468 |
| 5,153,561 | A * | 10/1992 | Johnson ................. | A45C 13/24 190/101 |
| 5,526,953 | A * | 6/1996 | Chieng .................... | A45C 5/02 206/387.1 |

(Continued)

*Primary Examiner* — Joshua E Rodden
(74) *Attorney, Agent, or Firm* — Pete Adams Law, PLLC

(57) ABSTRACT

The present invention provides an airtight, waterproof portable storage locker with a solar USB charger to store contents and power electronic devices on the go. The storage locker includes a plurality of containers including a top cover and a bottom case, a seal around the perimeter of the bottom case, a solar energy panel to power electronic devices when connected into multiple USB ports, a user configurable storage system to store contents, and a locking mechanism to securely lock the storage locker to prevent unwanted access to the internal contents stored therein.

12 Claims, 11 Drawing Sheets

(56) References Cited

U.S. PATENT DOCUMENTS

| | | | | |
|---|---|---|---|---|
| 6,305,185 | B1* | 10/2001 | Sloan | A45C 5/14 |
| | | | | 62/235.1 |
| D505,836 | S * | 6/2005 | Burkholder | D7/605 |
| 7,188,491 | B2* | 3/2007 | Donald, II | B62B 3/00 |
| | | | | 348/E5.128 |
| 9,448,000 | B2* | 9/2016 | Patsis | B62B 1/10 |
| 9,566,704 | B1* | 2/2017 | Stoikos | B25H 3/06 |
| 9,585,522 | B1* | 3/2017 | Brown, Sr. | B60R 9/02 |
| 10,236,711 | B1* | 3/2019 | Miller | H02J 7/35 |
| 10,393,415 | B1* | 8/2019 | Partee | F25B 27/002 |
| 10,676,267 | B2* | 6/2020 | Seiders | B65B 31/04 |
| 2003/0080124 | A1* | 5/2003 | Parker | B65D 25/16 |
| | | | | 220/4.21 |
| 2003/0111476 | A1* | 6/2003 | Serio, Jr. | A45C 13/008 |
| | | | | 220/835 |
| 2003/0139169 | A1* | 7/2003 | Arreazola, Jr. | H04B 1/086 |
| | | | | 455/344 |
| 2008/0035507 | A1* | 2/2008 | Collister | B25H 3/006 |
| | | | | 206/349 |
| 2008/0267592 | A1* | 10/2008 | Fiala | A45C 15/06 |
| | | | | 386/248 |
| 2008/0283114 | A1* | 11/2008 | Gray | H02S 40/42 |
| | | | | 136/245 |
| 2009/0021209 | A1* | 1/2009 | Lin | H02S 20/00 |
| | | | | 320/101 |
| 2009/0058352 | A1* | 3/2009 | Lin | H02J 7/35 |
| | | | | 320/101 |
| 2015/0069966 | A1* | 3/2015 | Overall | H02J 50/10 |
| | | | | 320/108 |
| 2016/0008973 | A1* | 1/2016 | Bensman | B25H 3/023 |
| | | | | 206/372 |
| 2016/0088910 | A1* | 3/2016 | Axton | A45C 11/24 |
| | | | | 206/524.3 |

* cited by examiner

PORTABLE SOLAR USB CHARGER STORAGE LOCKER

CROSS-REFERENCE TO RELATED APPLICATION

This application claims priority to, and any other benefit of, U.S. Provisional Patent Application Ser. No. 67/722,248, filed Aug. 24, 2018, the entire contents of which are hereby incorporated herein by reference in its entirety.

FIELD OF THE INVENTION

The present invention relates to portable storage container in general, more particularly to a portable solar chargeable device with a user adjustable storage retention system.

BACKGROUND OF THE INVENTION

Storing and transporting items of a valuable nature can be quite difficult. For many items like electronics, cigarettes, or other sensitive items, contact with liquid can render an item unusable. Likewise, items that require limited exposure to air like herbs or odorous items may become undesirable if exposure is not limited during transportation.

In addition, while carrying valuable electronics, power shortage can become an issue. Unless a user carries a charging cable and can locate an electric outlet, the device may become inoperable. Even if a user is able to locate an electrical outlet and is carrying a charging cable, they are required to remain in a specific location until a suitable charge within the electronic device is obtained.

Therefore, a need remains for a portable device which can provide a sufficient barrier to air and water exposure and charging capabilities to power electronics.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses various portable airtight solar storage lockers and its components.

It is an object of this invention to provide an airtight solar USB charger storage container comprising a plurality of containers including a top cover and a bottom case, and a seal around the perimeter of the bottom case for creating an airtight seal when the top cover and the bottom case come in full contact with each other. The top cover and the bottom case provided create an internal volume in which contents can be stored. The contents may include but not limited to jewelry, makeup, medication, herbs, electronics, or any solid item.

The seal when compressed between the top cover and the bottom case prevent the exposure of the internal contents to air, liquid, or other undesirable element. Likewise, the seal also prevents the escape of odors from the storage container and it prevents leakage from any liquid content stored therein too. The seal itself completely interacts with the top cover and the bottom case when the top cover is closed upon the bottom case thereby providing a water-proof and airtight storage container to carry valuable contents on the go discreetly.

It is an additional object of the invention to provide an air-tight solar USB charger storage container comprising a user configurable storage retention system which may include a removable compartment tray in the bottom case, a mesh netting storage in the top cover, clasp/bars, bands and mirror attached inside of the top cover. The removable compartment tray and the mesh net provides additional space to carry contents in the container. Whereas the clasp/bars and bands are provided to hold the contents in their position and not shift from their place in the container when the user is on the move. Furthermore, the mirror provided in the top cover could be lit with light emitting diodes placed adjacent to the mirror to provide light when using the mirror to apply makeup.

It is a further object of this invention to provide an airtight solar USB charger storage container comprising a built-in locking mechanism which may be used to securely lock the top cover to the bottom case and prevent unwanted access to the contents within the container. The locking mechanism in the preferred embodiment is a multi-digit combination lock where a user is required to enter the correct combination of sequence of symbols either three numbers or letters to release contact of the top cover with the bottom case. However, one of ordinary skill in the art will appreciate that, in certain embodiments, the lock could be any multi-digit combination style lock where at least two correct entries are made to align the locking mechanism and allow the release of the top cover and bottom case. In addition, the storage locker can also have a mechanical lock to provide a safe and secure way to the user to carry valuable contents.

It is still another object of this invention to provide an airtight and waterproof solar USB charger storage container comprising a light energy absorbing component, most notably known as a solar panel, mounted on an outer surface of the container in order to collect solar energy and convert it to electrical energy. The electrical energy is preferably stored in an electrical energy storage device known as a battery to supply energy to an electronic device via multiple USB ports located on the side of the bottom case of the container.

It is yet another object of this invention to provide a portable solar USB charger storage box further comprising a latch which allows for the release of the engagement between the top cover and the bottom case. The latch is installed on the top cover with a receiving portion positioned on the bottom case of the storage box. Upon closing the top cover and creating sealable contact between the top cover and the bottom case, the latch may be engaged with the receiving portion to maintain the contact between the top cover and the bottom case.

It is an another object of this invention to provide a handheld airtight storage solar box that is advantageous, desirable and useful.

In a preferred embodiment, a portable solar storage container comprises a top cover, a bottom case, a seal between the top cover and the bottom case to create an airtight seal between the top cover and the bottom case, a solar energy collector such as a solar panel to collect and convert solar energy into electrical energy which is stored in a battery and can be released to power electronic devices, a locking mechanism to prevent unwanted access to the internal contents of the container, a removable compartment tray inside the bottom case to support contents, a mirror disposed inside of the top cover, at least one LED (light emitting diode) adjacent to the mirror to provide light when using the mirror to apply makeup, and a mesh net attached inside of the top cover for additional storage.

In another embodiment, a portable solar storage container comprising a four-sided bottom case including a base and a perimeter sidewall extending upwardly from the base whereby the sidewall terminates at an open upper end thereby providing an internal volume for storage; a four-sided top cover having a top surface and a perimeter sidewall extending downwards from the top surface thereby providing an internal volume for storage, wherein the top cover is secured over the upper end of the bottom case to form a lid; a seal between the top cover and the bottom case to create an airtight and waterproof seal between the top cover and the bottom case when the top cover and the bottom case come in full contact with each other; a solar energy panel affixed on an exterior surface of the bottom case to power electronic devices when connected into multiple USB ports installed on exterior side of the bottom case; a user configurable storage system equipped within the internal volume formed in the top cover and the bottom case to store contents; a locking mechanism to securely lock the top cover to the bottom case to prevent unwanted access to the internal contents stored therein.

In an additional embodiment, a portable solar storage container comprising a four-sided bottom cover including a base and a perimeter sidewall extending upwardly from the base whereby the sidewall terminates at an open upper end thereby providing an internal volume for storage; a four-sided top cover having a top surface and a perimeter sidewall extending downwards from the top surface thereby providing an internal volume for storage, wherein the top cover is secured over the upper end of the bottom case to form a lid; a seal between the top cover and the bottom case to create an airtight and waterproof seal between the top cover and the bottom case when the top cover and the bottom case come in full contact with each other; a solar energy panel affixed on an exterior surface of the bottom case to power electronic devices when connected into USB ports located on exterior side of the bottom case; a locking mechanism to securely lock the top cover to the bottom case to prevent unwanted access to the internal contents stored; a removable compartment tray placed within the bottom case to store contents; a personal mirror mounted inside of the top cover; at least one light emitting diode adjacent to the mirror to provide light when using the mirror, a clasp bar inside the top cover to retain the contents in their position; and a mesh net attached inside of the top cover for additional storage.

These together with other objects and advantages which will become subsequently apparent reside in the details of the invention as more fully described and claimed, reference being had to the accompanying drawings forming a part thereof, wherein like numerals refer to like parts throughout.

BRIEF DESCRIPTION OF THE DRAWINGS

The novel features of the invention, as well as the invention itself, both as to its structure and its operation will be best understood from the accompanying drawings, taken in conjunction with the accompanying description, in which similar reference characters refer to similar parts, and in which.

DETAILED DESCRIPTION OF THE INVENTION

Figure 1:
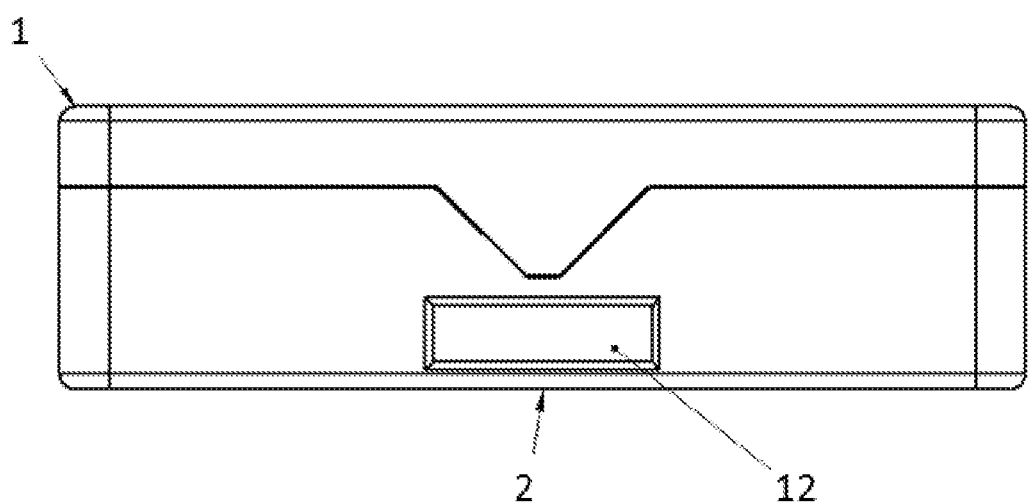
FIG. 1: shows a front view of closed portable solar USB storage container.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skill in the art without departing from the scope of the invention.

Figure 2:
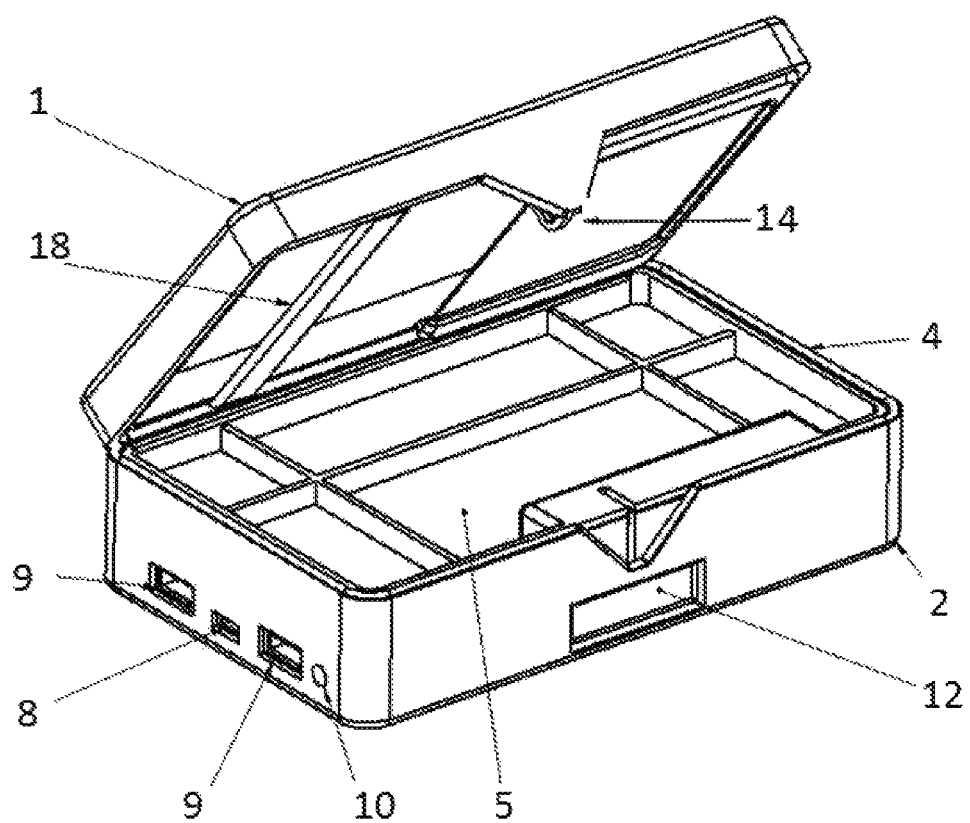
FIG. 2: shows a left side view of open portable solar USB storage container.
Figure 3:
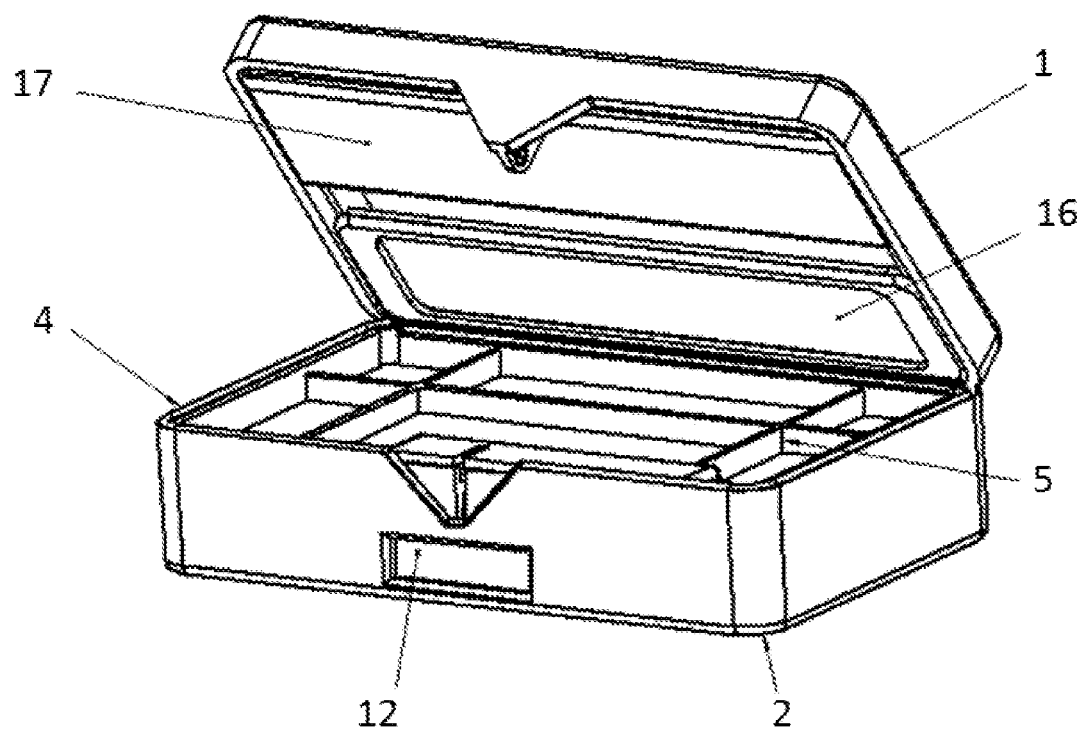
FIG. 3: shows a right side view of open portable solar USB storage container.

FIG. 1 shows a front view of the closed portable solar USB charger. As shown in FIG. 2, the portable solar storage locker of the present invention has plurality of containers including a top cover (1) and bottom case (2), a seal (4) glued on the perimeter of the bottom case (2). The bottom case (2) is a four sided container including a base and a perimeter sidewall extending upwardly from the base whereby the sidewall terminates at an open upper end thereby providing an internal volume for storage. The top cover (1) is a four-sided container having a top surface and a perimeter sidewall extending downwards from the top surface thereby providing an internal volume for storage. As can be seen in FIG. 1, the top cover (1) is secured over the upper end of the bottom case (2) to form a lid. The top cover (1) acts as a lid of the storage locker and is preferably hinged over the bottom case (2) or it can be removable in some embodiments.

The top cover (1) and bottom case (2) are preferably manufactured from a rigid material like plastic which can be formed into the desired shape of the box or container. For the purposes of this invention, it is desirable that the plastic used for the top cover (1) and the bottom case (2) have a low rate of permeability. Since it is a portable locker which will be used to store contents and charge electronic devices on the go, it is expected that the box may be dropped and therefore, a high impact rated material is preferred. The examples of materials that could be used to manufacture the container include but not limited to Polyurethane, Polyethylene, Polypropylene, ABS, Nylon.

The seal (4), placed around the perimeter of the bottom case (2) of the storage container, helps in creating a waterproof and airtight closure in the storage locker. The seal (4) used in the present invention is made from a compressible material which can be rubber, neoprene, foam, or other polymer, co-polymer, or monomer capable of compression. Non-limiting examples of these materials are SBR, Neoprene, Butyl, EPDM, Nitrile, Natural Rubber, Silicone, and Fluoroelastomer. In an alternative embodiment, the seal (4)

can be a gasket seal or o-ring type seal which is filled between the grooves and compressed to form a seal around the interference.

Figure 4:
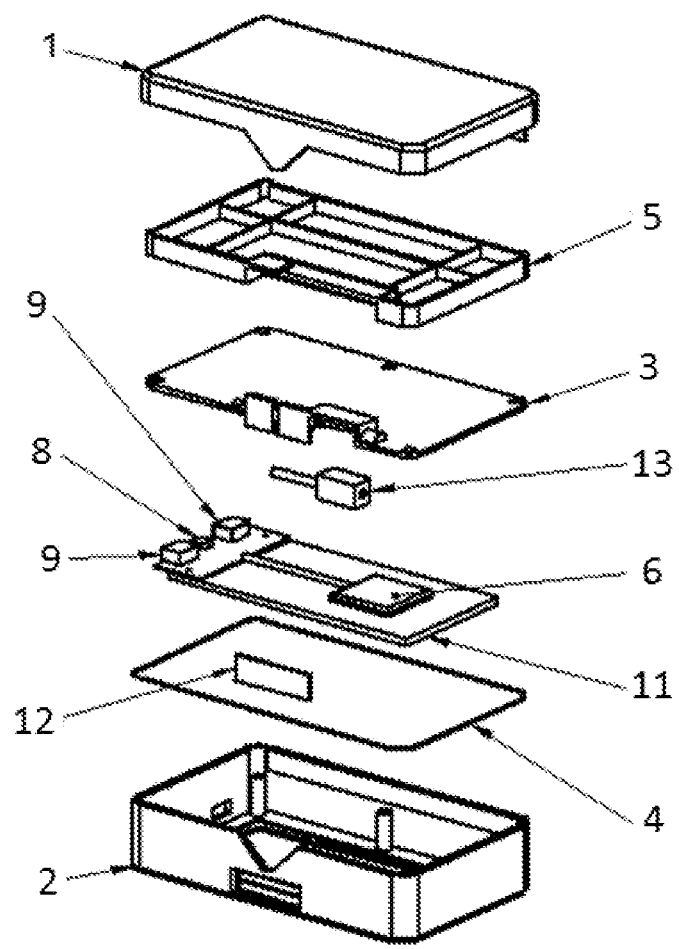
FIG. 4: depicts an exploded view of all major components of portable solar USB storage container.

FIG. 4 displays the internal cover (3) used for concealing the electronics and electronic modules required for charging the electronic devices of user. As shown in FIG. 4, the internal cover (3) also acts as a platform for the removable storage tray (5) in the bottom case (2) of the storage container. It is preferably constructed from injection molded plastic or metal.

Figure 5:
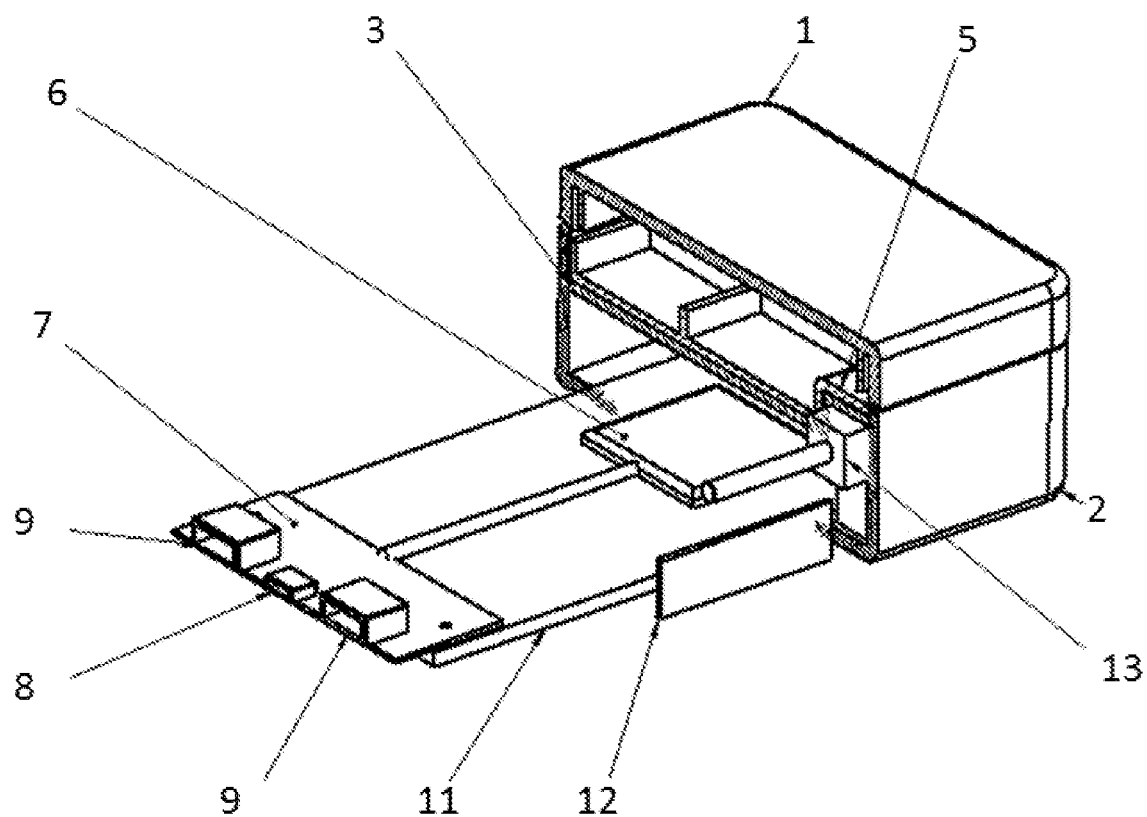
FIG. 5: depicts a left side cutaway view of solar storage container.
Figure 6:
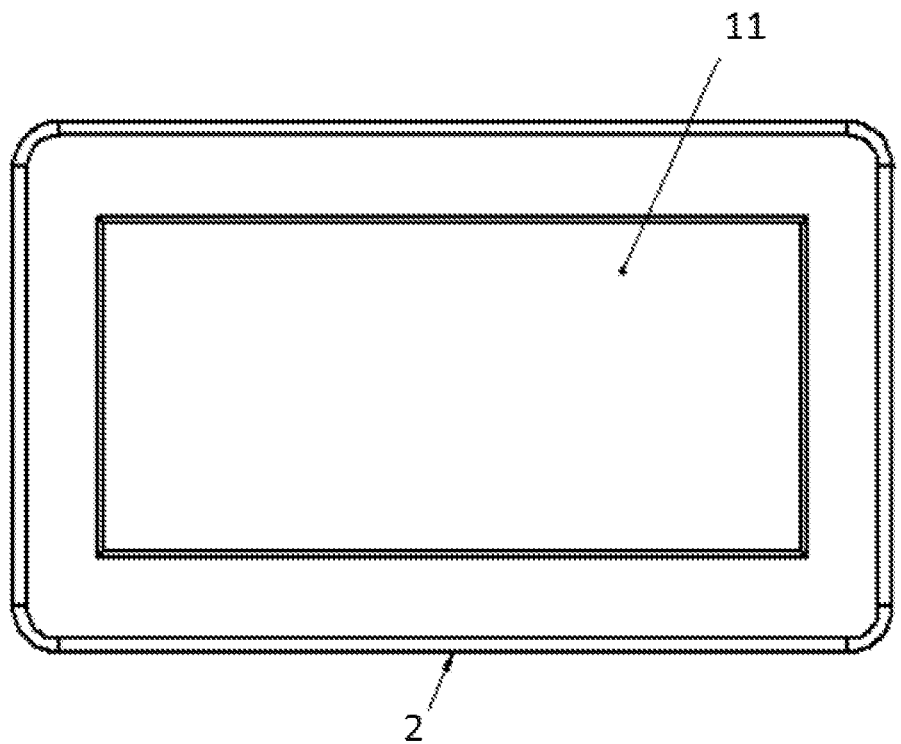
FIG. 6: is a bottom view of the storage container showing the position of solar panel.

A solar energy collector such as a solar panel (11), as can be seen in FIGS. 4, 5 & 6, is incorporated to collect and convert solar energy into electrical energy which is stored in a battery (6), as seen in FIGS. 4 & 5, and can be released to power electronic devices. The solar panel (11) is installed on the outer surface of the base of the bottom case (2). The battery (6) is supported on an electrical circuit assembly which monitors and adjusts the current output ultimately being supplied to an electronic device. The battery (6) used in the invention is preferably lithium-ion or Ni-cad. The charged battery (6) further powers the two USB ports (9) and mini-USB Port (8), as shown in FIG. 2, installed on one of the sidewall of the bottom case (2), which in turn charge the USB powered electronic device thereby keeping the user always connected on the go. FIG. 2 also depicts a LED battery level indicator (10) installed next to one of the USB ports (9) on the side of the bottom case (2) of the storage container. The LED battery level indicator (10) is placed to help the user identify the level of charge in battery.

FIGS. 1-5 depicts a built-in combination lock (12) placed in front of the bottom case (2) of the storage container. The combination lock (12) is provided to make the contents stored in the storage container secure. The lock preferred is a multi-digit combination lock wherein a user enters sequence of symbols, like numbers or letters, preset by the user thereby locking or unlocking the top cover (1) from the bottom case (2). The other two components that help in locking and unlocking of the storage container includes solenoid (13), shown in FIG. 4, an electro-mechanical component present in the circuit board and a solenoid plunger (14), depicted in FIG. 2, a cylindrical protruding shaft, mounted in the middle of the top cover with a receiving portion in the form of a catch, groove, or hole in the bottom case (2). Both solenoid (13) and solenoid plunger (14) comes into action when the user enters a sequence of symbol on the combination lock (12) thereby energizing the solenoid (13) with the power supplied from the battery (6), thus allowing unlocking or locking of the combination lock (12). In some embodiments, the solenoid plunger (14), attached underneath the latch, when depressed releases the seal (4) between the top cover (1) and bottom case (2) thus opening the solar charger storage container and providing access to the contents stored therein.

In additional embodiments, the mechanism that retains the top cover (1) to the bottom case (2) may also include zippers, sliding locks, and biometric fingerprint readers. However, one of ordinary skill in the art will appreciate that a non-electric lock could be used to retain the top cover to the bottom case. Further, as a result of an internal battery and external solar energy collector, one of ordinary skill in the art will appreciate that any electronic style lock could be used to retain the top cover to the bottom case.

Figure 7A:
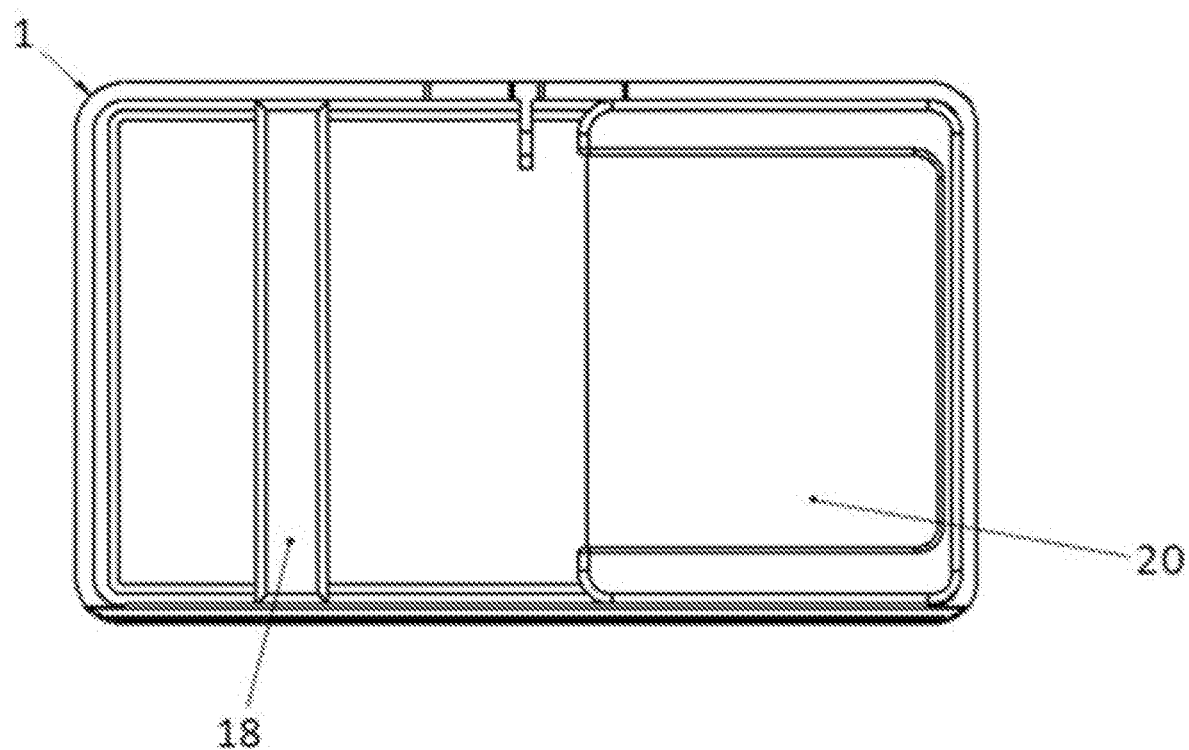
FIG. 7(a): illustrates an inside view of the top cover showing vertical narrow clasp bar and vertical mesh net.
Figure 7B:
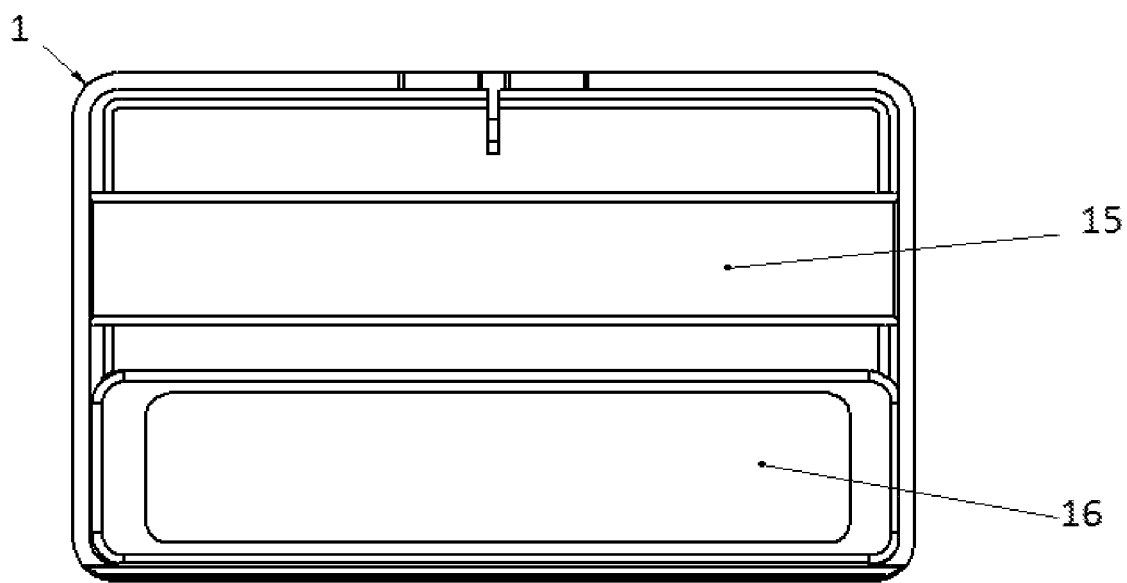
FIG. 7(b): illustrates an inside view of the top cover showing horizontal clasp bar and horizontal mesh net.
Figure 7C:
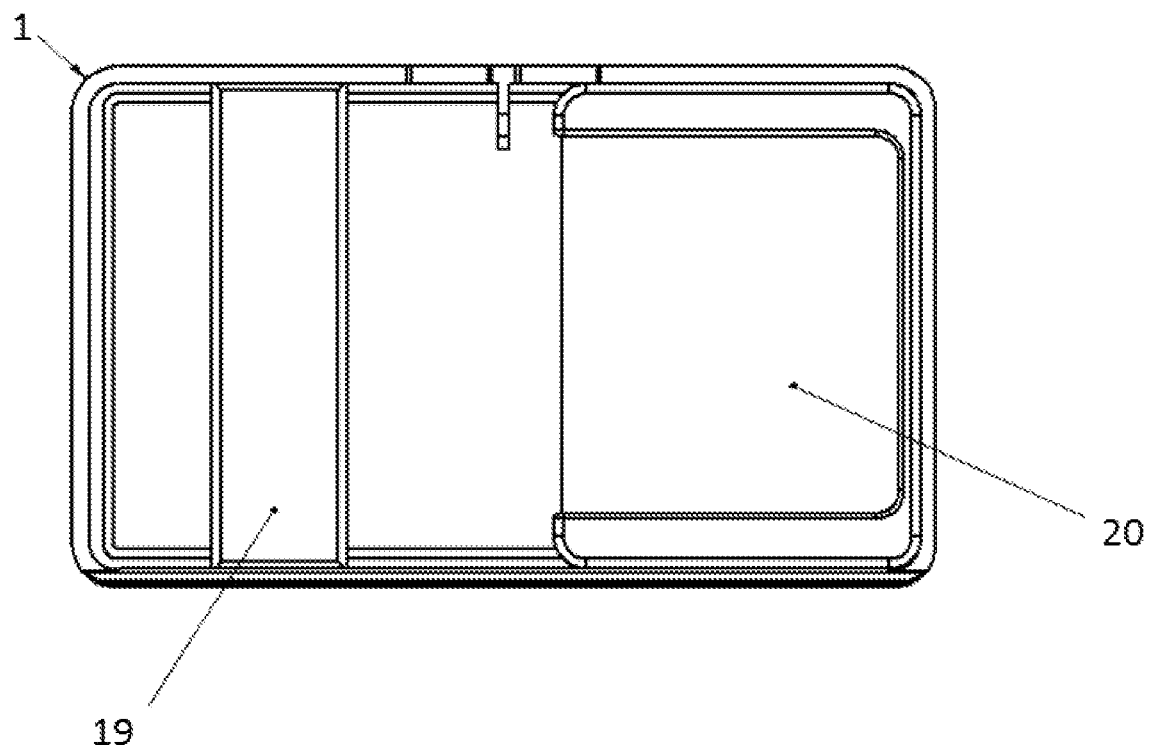
FIG. 7(c): illustrates an inside view of the top cover showing vertical wide clasp bar and vertical mesh net.
Figure 7D:
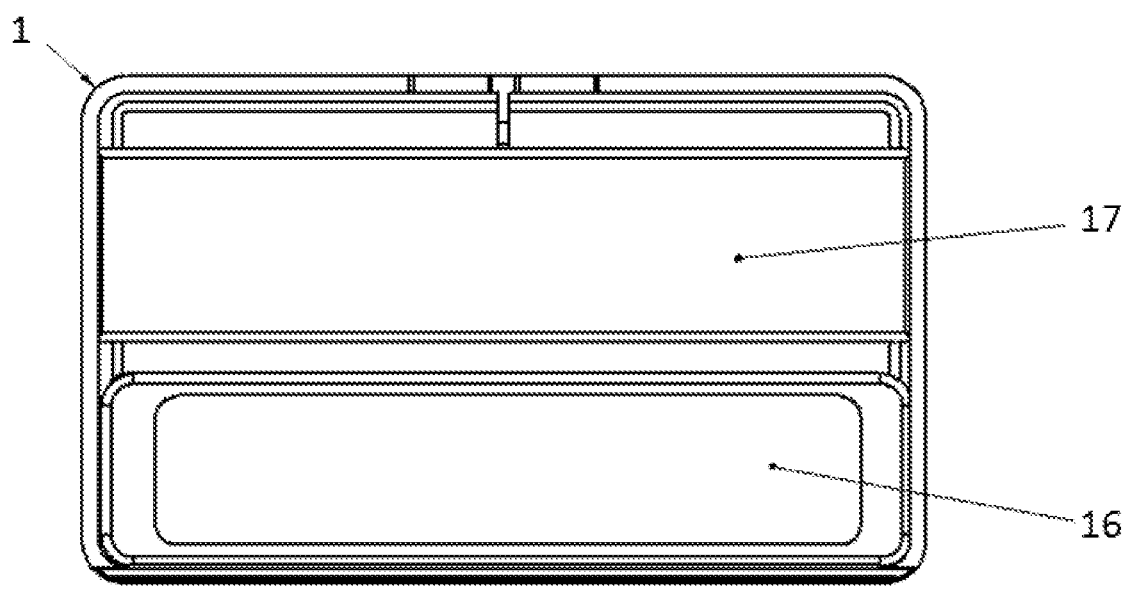
FIG. 7(d): illustrates an inside view of the top cover showing horizontal mirror and horizontal mesh net.
Figure 8:
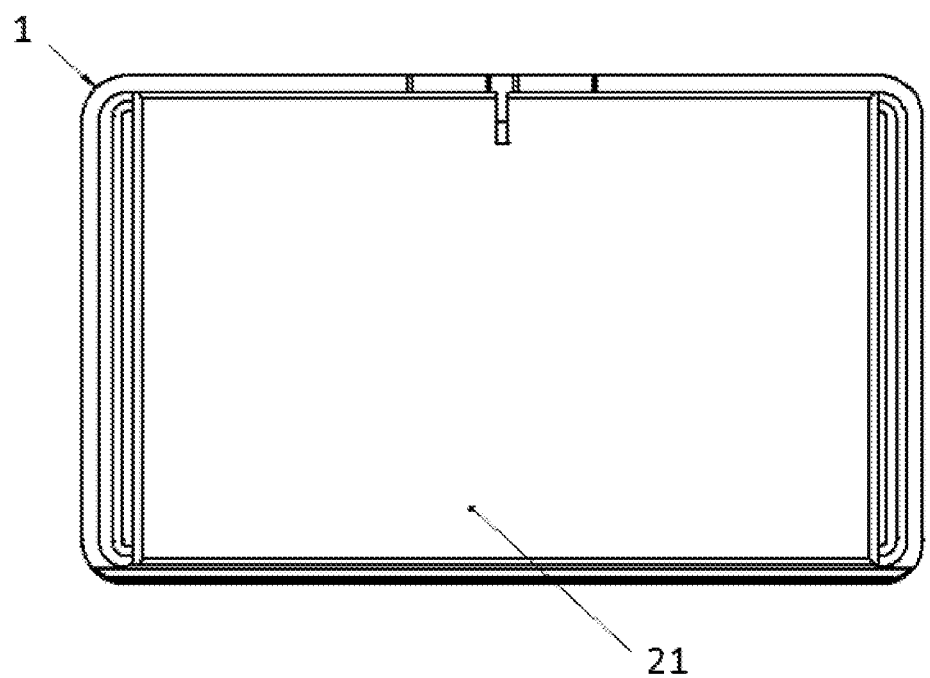
FIG. 8: illustrates an inside view of the top cover showing mirror.

FIGS. 2, 4, 7(a), 7(b), 7(c), and 7(d) shows a user configurable storage retention system, an important feature of the present invention. The user configurable storage retention system provides various additional storage options to the user. Preferably, it is constructed of injection molded plastic to provide strength and stability like the rest of the storage container. It may include a removable compartment tray (5), as shown in FIGS. 2 & 4, placed in the bottom case (2). Also, as seen in FIGS. 7(a), 7(b), 7(c), and 7(d), a mesh net affixed on the inside of the top cover can be used to store contents. The mesh net can be either placed horizontally or vertically inside the top cover. FIGS. 7(b) & 7(d) depicts a horizontal mesh net (16) whereas FIGS. 7(a) & 7(c) shows a vertical mesh net (20). In addition, clasp bars, as shown in FIGS. 7(a), 7(b), & 7(c), helps in retaining any contents stored in the top cover of the storage container. In some embodiments, the clasp bars can be horizontally or vertically affixed to the inside of the top cover as seen in FIGS. 7(a), 7(b), & 7(c). In addition, the clasp bar could also be narrow or wider in size. FIG. 7(a) shows a vertical narrow clasp bar (18) whereas FIG. 7(c) illustrates a vertical wide clasp bar (19) inside of the top cover (1). FIG. 7(b) shows the feature of horizontal wide clasp bar (15). The contents that may require clasp bars to secure them in their position may include rolled tobacco, cigarettes, e-cigarette vape cartridges, and the like. In some embodiments, a personal mirror, as can be seen in FIGS. 7(d) & 8, which could be either mounted or snap-pushed to affix within the internal volume of the top cover of the container can also be provided for the user. The personal mirror can be placed horizontally (17), as shown in FIG. 7(d) or it can also cover the whole of internal volume of the top container. FIG. 8 shows an embodiment wherein a full mirror (21) covers entire internal volume of the top cover (1). Furthermore, there is also provision of LEDs around the mirror to provide light to the user thereby making the use of storage container in the dark too.

The exploded view in FIG. 4 shows all the parts required to build the portable storage locker according to one embodiment. It starts with the bottom case (2) at the bottom level formed by the perimeter sidewall with a base, followed by the seal (4) around the perimeter of the bottom case (2). The multi-digit combination lock (12) is installed on the front sidewall of the bottom case (2). The next layer includes the circuit board which has solar panel (11), battery (6), multiple USB ports (9) including mini-USB port (8). It also includes solenoid (13) to assist with the functioning of multi-digit combination lock (12). The exploded view in FIG. 4 further displays the internal cover (3) which is placed to cover the circuit board. The removable compartment tray (5) is placed above the internal cover (3). The top cover (1) with the latch is attached to the bottom case (3) thereby completing the portable storage locker.

Electronic devices that may be connected to the USB ports include, but are not limited to, phones, headphones, and vape pens. These items may be charged by connecting a charging cord from the device to the output USB port of the storage container. In other embodiments, the circuit may comprise an induction element to provide energy wirelessly from the battery to the device. This removes the need to ensure a charging cord is present when using the box.

Further, the portable solar USB charger storage container may have optional features including but not limited to straps or belt bags, keychains, waist packs, phone case thereby making it more practical and useful for the user.

Although not explicitly shown or described herein, the portable solar storage container may be used to store variety of contents. As non-limiting examples, the contents may include cigarette, e-cigarette, medicines, make-up products, herbs, jewelry, candies, keys, earphones, and for any such content that can fit into the storage container.

While many of the fundamental characteristics and features of the portable solar storage container have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit and scope of the invention. Consequently, all such modifications and variations are included within the scope of the invention as defined herein.

What is claimed is:

1. A portable solar storage container comprising:
a four-sided bottom case including a base and a perimeter sidewall extending upwardly from the base whereby the sidewall terminates at an open upper end thereby providing an internal volume for storage;
a four-sided top cover having a top surface and a perimeter sidewall extending downwards from the top surface thereby providing an internal volume for storage, wherein the top cover is secured over the upper end of the bottom case to form a lid;
a seal between the top cover and the bottom case to create an airtight and waterproof seal between the top cover and the bottom case when the top cover and the bottom case come in full contact with each other;
a solar energy panel affixed on an exterior surface of the bottom case to power electronic devices when connected into multiple USB ports located on exterior side of the bottom case;
a user configurable storage system equipped within the internal volume formed in the top cover and the bottom case to store contents;
a mirror mounted inside of the top cover; and
a locking mechanism to securely lock the top cover to the bottom case to prevent unwanted access to the internal contents stored therein.

2. The storage container of claim 1, wherein the bottom case includes a four-sided internal cover placed on the base of the bottom case thereby covering an electric circuit assembly in the bottom case used to charge the electronic devices.

3. The storage container of claim 1, wherein the solar energy panel collects and convert solar energy into electrical energy which is stored in a battery situated in the base of the bottom case.

4. The storage container of claim 1, wherein the user configurable storage system inside the top cover and the bottom case to store contents includes removable compartment tray, mesh netting, clasp bars to retain contents in their place.

5. The storage container of claim 1, wherein the locking mechanism to securely lock the top cover to the bottom case to prevent unwanted access to the internal contents stored is a multi-digit combination lock where a user is required to enter the correct sequence of symbols to release contact between the top cover and the bottom case.

6. A portable solar storage container comprising:
a four-sided bottom cover including a base and a perimeter sidewall extending upwardly from the base whereby the sidewall terminates at an open upper end thereby providing an internal volume for storage;
a four-sided top cover having a top surface and a perimeter sidewall extending downwards from the top surface thereby providing an internal volume for storage, wherein the top cover is secured over the upper end of the bottom case to form a lid;
a seal between the top cover and the bottom case to create an airtight and waterproof seal between the top cover and the bottom case when the top cover and the bottom case come in full contact with each other;
a solar energy panel affixed on an exterior surface of the bottom case to power electronic devices when connected into USB ports located on exterior side of the bottom case;
a locking mechanism to securely lock the top cover to the bottom case to prevent unwanted access to the internal contents stored;
a removable compartment tray inside the bottom case to support contents, a mirror mounted inside of the top cover,
at least one light emitting diode adjacent to the mirror to provide light when using the mirror; a clasp bar inside the top cover to retain the contents in their position; and
a mesh net attached inside of the top cover for additional storage.

7. The storage container of claim 6, wherein the mirror is configured to attach to cover the entire internal volume within the top cover.

8. The storage container of claim 6, wherein the mirror is configured to attach to cover only a portion of the internal volume within the top cover.

9. The storage container of claim 6, wherein the light emitting diodes are configured to attach around the whole mirror.

10. The storage container of claim 6, wherein the clasp bar is configured to be placed either horizontally or vertically inside of the top cover.

11. The storage container of claim 6, wherein the clasp bar is configured to be either wide or narrow in size.

12. The storage container of claim 6, wherein the mesh net is configured to be placed either horizontally or vertically inside of the top cover.

* * * * *